US012670229B2

(12) United States Patent
Takano

(10) Patent No.: US 12,670,229 B2
(45) Date of Patent: Jun. 30, 2026

(54) SOLUTION SYSTEM, SOLUTION METHOD, AND SOLUTION PROGRAM

(71) Applicant: NEC Corporation, Minato-ku (JP)

(72) Inventor: Fumiyo Takano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 941 days.

(21) Appl. No.: 17/909,070

(22) PCT Filed: Mar. 30, 2020

(86) PCT No.: PCT/JP2020/014476
§ 371 (c)(1),
(2) Date: Sep. 2, 2022

(87) PCT Pub. No.: WO2021/199119
PCT Pub. Date: Oct. 7, 2021

(65) Prior Publication Data
US 2023/0090183 A1      Mar. 23, 2023

(51) Int. Cl.
*G06N 10/40*      (2022.01)
*G06F 17/11*      (2006.01)
*G06F 17/16*      (2006.01)
*G06N 5/01*      (2023.01)

(52) U.S. Cl.
CPC .............. *G06F 17/16* (2013.01); *G06F 17/11* (2013.01); *G06N 5/01* (2023.01)

(58) Field of Classification Search
CPC ........... G06F 17/16; G06F 17/11; G06N 5/01; G06N 10/60; G06N 10/40; G06Q 10/04
See application file for complete search history.

(56) References Cited

U.S. PATENT DOCUMENTS

| | | | |
|---|---|---|---|
| 2006/0164688 A1* | 7/2006 | Manuel de Pena .. | G06K 15/107 358/3.03 |
| 2018/0157775 A1* | 6/2018 | Ronagh ................... | G06F 30/20 |
| 2019/0266212 A1 | 8/2019 | Goto et al. | |
| 2021/0118217 A1* | 4/2021 | Moloney ................. | G06T 7/75 |
| 2022/0391741 A1* | 12/2022 | McMahon ............. | G06N 10/20 |

FOREIGN PATENT DOCUMENTS

JP      2019-145010 A      8/2019

OTHER PUBLICATIONS

International Search Report for PCT Application No. PCT/JP2020/014476, mailed on Jul. 14, 2020.
Kei Ueda et al., "Data Structure for Quantum Annealing Emulator", Proceedings of the Design Automation Symposium 2019 (DAS2019). Information Processing Society of Japan, Aug. 21, 2019, vol. 2019, pp. 39-44.

* cited by examiner

*Primary Examiner* — Brian W Wathen
(74) *Attorney, Agent, or Firm* — Sughrue Mion, PLLC

(57)      ABSTRACT

Provided is a solution system capable of obtaining the optimal state of individual spins with a small amount of memory. The matrix simplification means 93 changes a matrix used in an energy function in a model representing states of individual spins by a first value or a second value into simplified form. In this case, the matrix simplification means 93 deletes elements that have a value of "0" from the matrix, and also deletes some elements that do not have the value of "0" from the matrix, thereby to change the matrix into the simplified form. The spin state derivation means 94 derives the optimal state of each spin based on the matrix changed into the simplified form.

9 Claims, 9 Drawing Sheets

FIG. 6

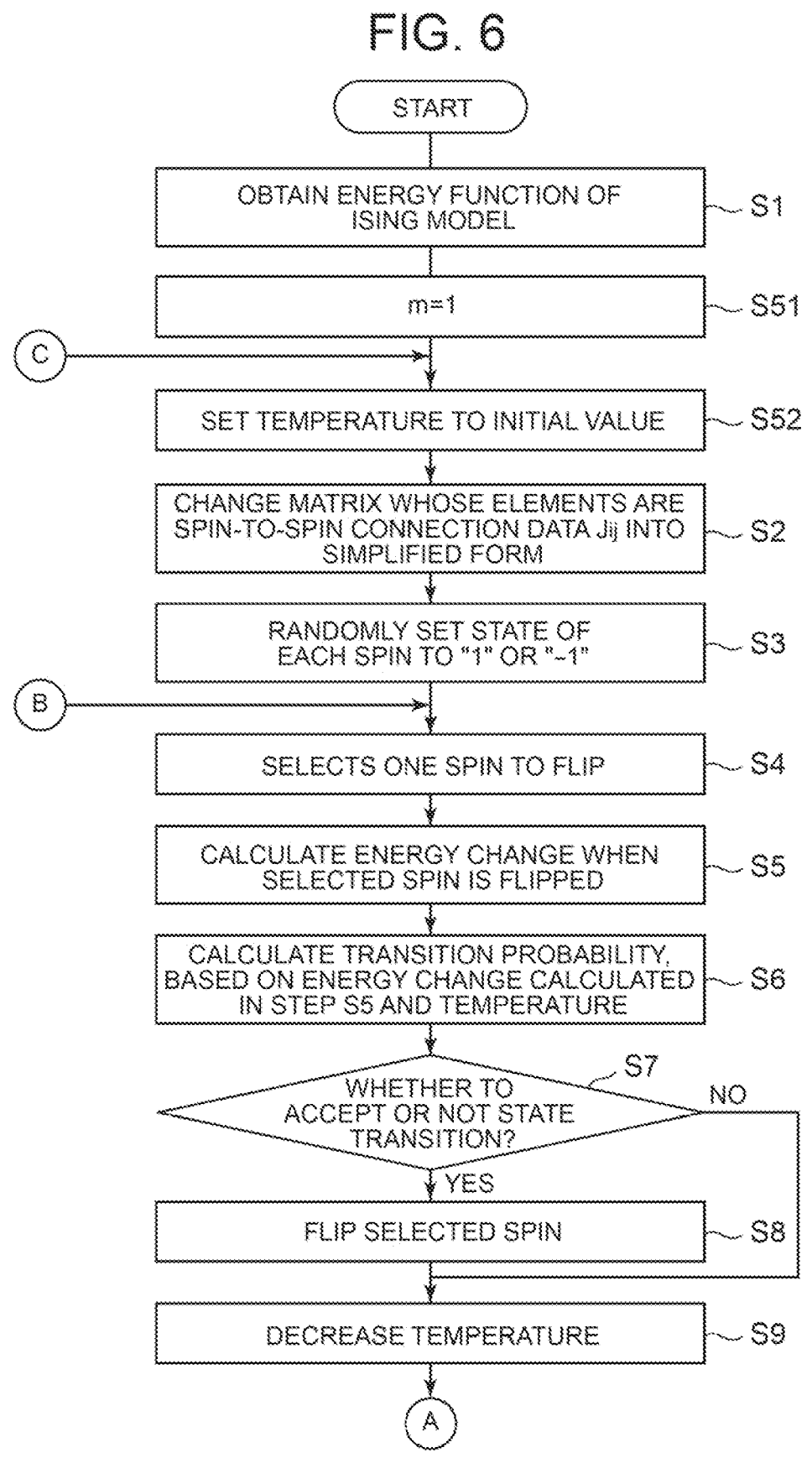

START

OBTAIN ENERGY FUNCTION OF ISING MODEL — S1 m=1 — S51

C →

SET TEMPERATURE TO INITIAL VALUE — S52

CHANGE MATRIX WHOSE ELEMENTS ARE SPIN-TO-SPIN CONNECTION DATA $J_{ij}$ INTO SIMPLIFIED FORM — S2

RANDOMLY SET STATE OF EACH SPIN TO "1" OR "~1" — S3

B →

SELECTS ONE SPIN TO FLIP — S4

CALCULATE ENERGY CHANGE WHEN SELECTED SPIN IS FLIPPED — S5

CALCULATE TRANSITION PROBABILITY, BASED ON ENERGY CHANGE CALCULATED IN STEP S5 AND TEMPERATURE — S6

WHETHER TO ACCEPT OR NOT STATE TRANSITION? — S7    NO

YES

FLIP SELECTED SPIN — S8

DECREASE TEMPERATURE — S9

A

FIG. 8
1000
1001 — CPU     1005 — DATA READING DEVICE
AUXILIARY MEMORY     MAIN MEMORY     INTERFACE
1003     1002     1004
FIG. 9
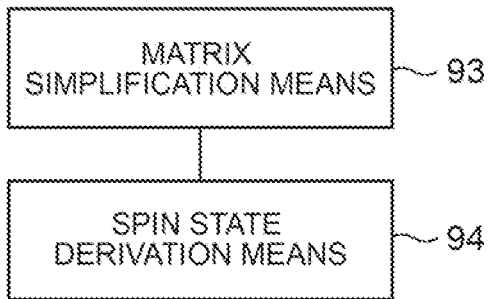
MATRIX SIMPLIFICATION MEANS — 93
SPIN STATE DERIVATION MEANS — 94
FIG. 10
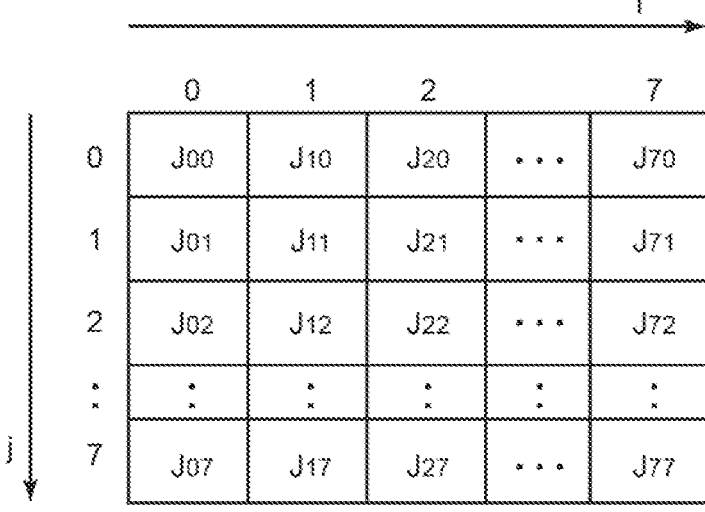
| | | 0 | 1 | 2 | | 7 |
|---|---|---|---|---|---|---|
| | 0 | $J_{00}$ | $J_{10}$ | $J_{20}$ | $\cdots$ | $J_{70}$ |
| | 1 | $J_{01}$ | $J_{11}$ | $J_{21}$ | $\cdots$ | $J_{71}$ |
| | 2 | $J_{02}$ | $J_{12}$ | $J_{22}$ | $\cdots$ | $J_{72}$ |
| | $\vdots$ | $\vdots$ | $\vdots$ | $\vdots$ | $\vdots$ | $\vdots$ |
| | 7 | $J_{07}$ | $J_{17}$ | $J_{27}$ | $\cdots$ | $J_{77}$ |

SOLUTION SYSTEM, SOLUTION METHOD, AND SOLUTION PROGRAM

This application is a National Stage Entry of PCT/JP2020/014476 filed on Mar. 30, 2020, the contents of all of which are incorporated herein by reference, in their entirety.

TECHNICAL FIELD

The present invention relates to a solution system, a solution method, and a solution program, and in particular, to a solution system, a solution method, and a solution program for obtaining a state of each spin corresponding to a solution of a combinatorial optimization problem.

BACKGROUND ART

An energy function of the Ising model is used in solving combinatorial optimization problems. Examples of combinatorial optimization problems include the traveling salesman problem, the knapsack problem, and the graph partitioning problem. However, combinatorial optimization problems are not limited to these problems.

The Ising model is a model in statistical mechanics that represents the behavior of a magnetic material by individual spins, and it is also applicable to solving combinatorial optimization problems. In the Ising model, the states of individual spins are represented by "1" or "−1".

"1" in the Ising model can be referred to as the first value. "−1" in the Ising model can be referred to as the second value.

When solving a combinatorial optimization problem, the first step is to create an expression representing the energy in the combinatorial optimization problem. For example, when solving the traveling salesman problem, an expression representing the energy in the traveling salesman problem is created. Then, the expression representing the energy in the combinatorial optimization problem is converted to the energy function in the Ising model. This conversion method is known.

The energy function in the Ising model is expressed as in Expression (1) below.

[Math. 1]

$$H_{Ising} = \Sigma_{ij} J_{ij} s_i s_j + \Sigma_i h_i s_i \qquad (1)$$

Both i and j in Expression (1) are variables representing a spin. In addition, $s_i$ in Expression (1) is a variable representing the state of spin i, and $s_j$ is a variable representing the state of spin j. $h_i$ in Expression (1) is a constant corresponding to spin i. For each possible value of i, $h_i$ is determined as a constant. $J_{ij}$ in Expression (1) is a constant corresponding to a combination of spin i and spin j. For each combination of possible value of i and possible value of j, $J_{ij}$ is determined as a constant.

Specifically, $J_{ij}$ is a constant that represents interaction between spin i and spin j. The interaction between the spins is said to be connected between spins. When spin i and spin j are connected, $J_{ij}$ is not 0. The greater the degree of interaction (degree of coupling) between spins, the greater the absolute value of $J_{ij}$. When spin i and spin j are unconnected, $J_{ij}=0$. $J_{ij}$ is also referred to as the spin-to-spin connection data.

The fact that any of the individual spins is connected to each of all other spins is called fully connected. The existence of a combination of unconnected spins is called sparsely connected.

When the number of spins is N, then the number of $J_{ij}$ is $N^2$. In this case, the $N^2$ constants $J_{ij}$ can be represented as elements of an N-by-N matrix. FIG. 10 is a schematic diagram showing a matrix with $J_{ij}$ as an element in the case of eight spins. When the number of spins is eight, for example, as shown in FIG. 10, $0 \le i \le 7$ (where i is an integer), $0 \le j \le 7$ (where j is an integer), and $0 \le j \le 7$ (where j is an integer). In FIG. 10, the case where the number of spins is eight is used as an example to simplify the drawing, but the number of spins is not limited to eight.

Given the energy function shown in Expression (1), the optimal state of individual spins (1 or −1) is obtained. The optimal state of individual spins is the state of individual spins such that the energy indicated by the energy function is as small as possible, or the state of individual spins such that the energy indicated by the energy function is as large as possible. The optimal state of individual spins to be obtained is externally specified as either the state of individual spins in which the energy indicated by the energy function is as small as possible, or the state of individual spins in which the energy indicated by the energy function is as large as possible. The optimal state of individual spins so obtained represents the solution to the combinatorial optimization problem. The following is an example of a case in which it is externally specified that the optimal state of individual spins is one in which the energy indicated by the energy function is as small as possible. However, the same applies to the case where it is externally specified that the optimal state of individual spins is one in which the energy indicated by the energy function is as large as possible.

In order to obtain the state of individual spins such that the energy indicated by the energy function shown in Expression (1) is as small as possible, hardware capable of implementing a graph representing the Ising model is required.

The Ising model in the case of fully connected can be represented, for example, by a complete graph. FIG. 11 shows an example of a complete graph for the case of eight spins. In FIG. 11, the case with eight spins is also used as an example to simplify the drawing, but the number of spins is not limited to eight. The eight nodes shown in FIG. 11 represent eight spins. Each edge connecting the nodes represents a connection between spins, and each edge is assigned a $J_{ij}$ value corresponding to a combination of spins.

If the hardware is capable of implementing a complete graph with N nodes, the Ising model can be represented as a graph whether it is in the fully connected case or the sparsely connected case, on the condition that the number of spins is N or less. In other words, the energy function of the Ising model for the fully connected case can be given, or the energy function of the Ising model for the sparsely connected case can be given, on the condition that the number of spins is N or less, the state of individual spins such that the energy is as small as possible can be obtained.

However, a memory with a large capacity is required to represent the complete graph. For example, a memory with a capacity to store all the spin-to-spin connection data $J_{ij}$, as illustrated in FIG. 10, is required.

In addition, when the expression representing the energy in a combinatorial optimization problem is converted to the energy function in the Ising model, it is often not fully connected. When obtaining the state of each spin corresponding to the solution of a combinatorial optimization problem that is not required to be fully connected, unused memory space occurs in hardware that can implement the complete graph. Such unused memory space can be said to be an over-implemented resource.

PTL 1 discloses that if the matrix representing $J_{ij}$ is a sparse matrix, a sparse matrix compression format may be used.

CITATION LIST

Patent Literature

PTL 1: Japanese Patent Application Laid-Open No. 2019-145010

SUMMARY OF INVENTION

Technical Problem

As in the technique described in PTL 1, using the sparse matrix compression format, when the matrix representing $J_{ij}$ is a sparse matrix, means that the matrix is represented in the form in which elements with the value "0" are deleted. According to such a technique, the amount of memory can be reduced by the amount that elements with a value of "0" are deleted.

However, it is desirable to be able to obtain the optimal state of individual spins with even less memory capacity.

Therefore, an object of the present invention is to provide a solution system, a solution method, and a solution program that can obtain the optimal state of individual spins with a small amount of memory.

Solution to Problem

A solution system according to the present invention includes: matrix simplification means for changing a matrix used in an energy function in a model representing states of individual spins by a first value or a second value into simplified form; and spin state derivation means for deriving state of each spin when energy represented by the energy function is as small as possible or a state of each spin when energy represented by the energy function is as large as possible, based on the matrix changed into the simplified form, wherein the matrix simplification means deletes elements that have a value of "0" from the matrix, and also deletes some elements that do not have the value of "0" from the matrix, thereby to change the matrix into the simplified form, wherein whether the spin state derivation means derives the state of each spin when energy represented by the energy function is as small as possible or the state of each spin when energy represented by the energy function is as large as possible is specified from outside.

A solution method according to the present invention includes: executing a matrix simplification process of changing a matrix used in an energy function in a model representing states of individual spins by a first value or a second value into simplified form; and executing a spin state derivation process of deriving state of each spin when energy represented by the energy function is as small as possible or a state of each spin when energy represented by the energy function is as large as possible, based on the matrix changed into the simplified form, wherein the matrix simplification process comprises: deleting elements that have a value of "0" from the matrix, and also deleting some elements that do not have the value of "0" from the matrix, thereby to change the matrix into the simplified form, wherein whether to derive, in the spin state derivation process, the state of each spin when energy represented by the energy function is as small as possible or the state of each spin when energy represented by the energy function is as large as possible is specified from outside.

A computer-readable recording medium according to the present invention is a computer-readable recording medium in which a solution program is recorded, wherein the solution program causes a computer to execute: a matrix simplification process of changing a matrix used in an energy function in a model representing states of individual spins by a first value or a second value into simplified form; and a spin state derivation process of deriving state of each spin when energy represented by the energy function is as small as possible or a state of each spin when energy represented by the energy function is as large as possible, based on the matrix changed into the simplified form, wherein the solution program causes a computer to execute, in the matrix simplification process, deleting elements that have a value of "0" from the matrix, and also deleting some elements that do not have the value of "0" from the matrix, thereby to change the matrix into the simplified form, wherein whether to cause the computer to derive, in the spin state derivation process, the state of each spin when energy represented by the energy function is as small as possible or the state of each spin when energy represented by the energy function is as large as possible is specified from outside.

Advantageous Effects of Invention

According to the present invention, the optimal state of individual spins can be obtained with a small amount of memory.

BRIEF DESCRIPTION OF DRAWINGS

FIG. 6 It depicts a flowchart showing an example of the processing flow of the solution system in the second example embodiment of the present invention.

FIG. 8 It depicts a schematic block diagram showing an example of computer configuration of the solution system of each example embodiment of the present invention.

FIG. 9 It depicts a block diagram showing an overview of the solution system of the present invention.

FIG. 10 It depicts a schematic diagram showing a matrix with $J_{ij}$ as an element in the case of eight spins.

DESCRIPTION OF EMBODIMENTS

Example embodiments of the present invention is described below with reference to the drawings.

First Example Embodiment

Figure 1:
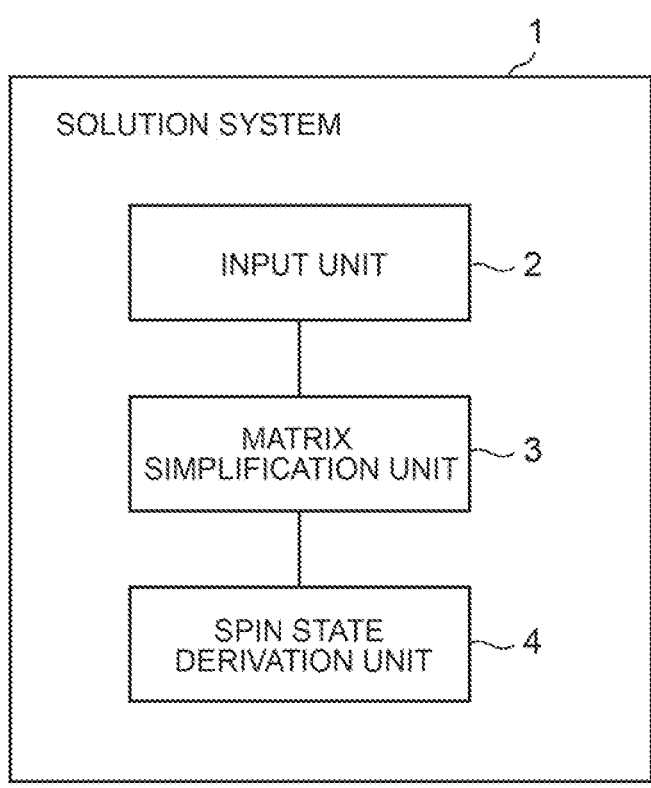
FIG. 1 It depicts a block diagram showing an example of a solution system of the first example embodiment of the present invention.

FIG. 1 is a block diagram showing an example of a solution system of the first example embodiment of the present invention. In the first example embodiment, the solution system 1 includes an input unit 2, a matrix simplification unit 3, and a spin state derivation unit 4.

In each example embodiment, as in the previous case, it is assumed that both i and j are variables representing a spin. For the sake of simplicity of explanation, where appropriate, the case in which the number of spins is eight will be used as an example. However, the number of spins is not limited to eight. In each example embodiment, when the number of spins is eight, as described above, $0 \leq i \leq 7$ (where i is an integer), $0 \leq j \leq 7$ (where j is an integer). The possible values of i and j "0", "1", "2", . . . , "7" are identification information of spin.

The input unit 2 is an input device for obtaining the energy function of the Ising model. The energy function of the Ising model is expressed as in Expression (1) above, and the input unit 2 obtains the matrix whose elements are the spin-to-spin connection data $J_{ij}$ defined for each combination of possible value of i and possible value of j, and the individual constants $h_i$ defined for each possible value of i. Obtaining this matrix and the individual $h_i$ means obtaining the energy function of the Ising model.

The input unit 2 obtains the matrix whose elements are the spin-to-spin connection data $J_{ij}$ and the individual $h_i$ in file format. In this case, since the matrix is described in a file, the individual elements of the matrix can be referenced even if the solution system does not include a memory that has the capacity to store the entire matrix with the spin-to-spin connection data $J_{ij}$ as elements.

The input unit 2 may be realized by a data reading device that reads a file recorded on a data recording medium such as an optical disk, for example, but input unit 2 is not limited to such data reading devices. For example, input unit 2 may be realized by a communication interface that receives a file delivered over a communication network.

The energy function of the Ising model obtained by the input unit 2 is the energy function converted from the expression representing energy in a combinatorial optimization problem.

In the Ising model, a set of spins may be defined and a constraint may be placed on the set. For example, when four spins "0" to "3" are defined to form a set, and on the set, a constraint "only one spin belonging to the set must be in state "1" and the remaining three spins must be in state "0"" may be placed. However, the constraint is not limited to the above example. For example, the number of spins in a set subject to a constraint is not limited to four. The content of the constraint is also not limited to the above example. Also, the number of sets of spins for which a constraint is defined is not limited to one, and there may be multiple sets of spins for which a constraint is defined.

When a set of spins is defined and a constraint is defined for the set, the input unit 2 also obtains the constraint and the identification information of each spin belonging to the set for which the constraint is defined. The constraint and the identification information of each spin belonging to the set for which the constraint is defined may also be described in a file that describes a matrix whose elements are the spin-to-spin connection data $J_{ij}$ and the individual $h_i$. The input unit 2 may obtain the file.

Between any two spins belonging to the set for which the constraint is defined, they are connected. That is, the value of $J_{ij}$ corresponding to any two spins belonging to the set for which the constraint is defined is not zero.

The matrix simplification unit 3 changes the matrix obtained by the input unit 2 (a matrix whose elements are the spin-to-spin connection data $J_{ij}$ defined for each combination of possible value of i and possible value of j) into a simplified form. Hereafter, the matrix obtained by the input unit 2 may be referred to as the original matrix.

Figure 2:
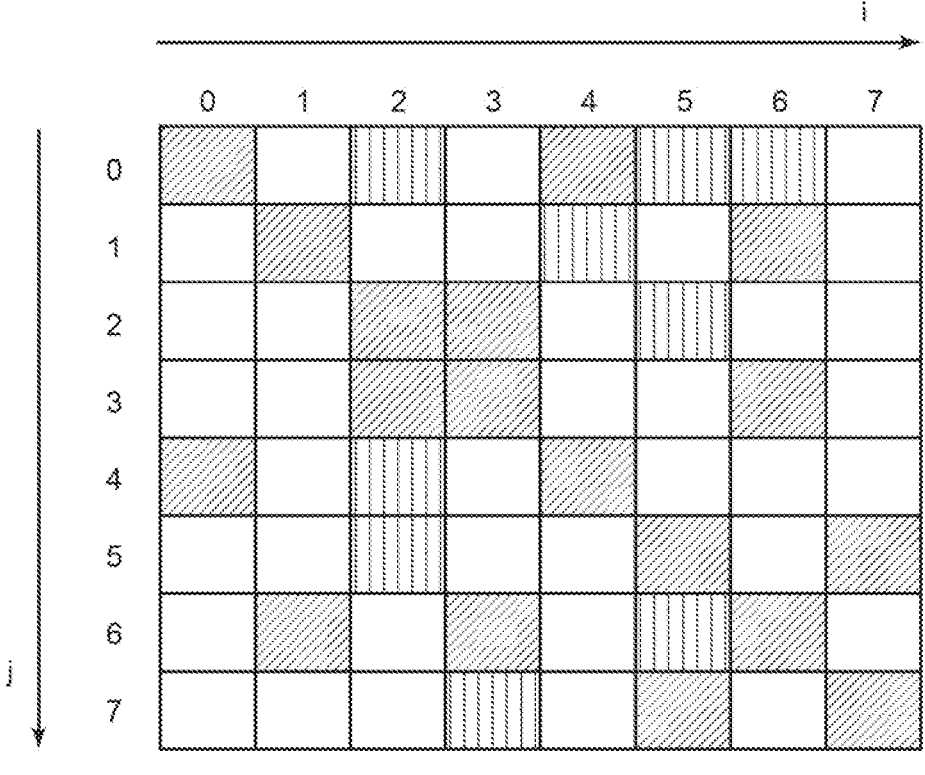
FIG. 2 It depicts a schematic diagram schematically showing an example of a state in which the entire matrix is stored in a memory, assuming that there is a memory for storing the entire matrix.

The solution system 1 is does not include a memory for storing the entire original matrix. Assuming that there is a memory for storing the entire original matrix, an example of a state in which the entire original matrix is stored in the memory is shown in FIG. 2. In FIG. 2, the white color means that the value of the spin-to-spin connection data $J_{ij}$ is 0. The shaded and vertical line patterns mean that the value of the spin-to-spin connection data $J_{ij}$ is non-zero. The vertical line pattern means that the value of the spin-to-spin connection data $J_{ij}$ is non-zero, but the absolute value is small (e.g., absolute value is equal to or less than a threshold value).

The matrix simplification unit 3 deletes elements that have a value of "0" from the original matrix. The matrix simplification unit 3 also deletes some elements that do not have the value of "0" from the original matrix. Then, the matrix simplification unit 3 packs the remaining elements undeleted on the 0th column side. In this example, the remaining elements are packed on the 0th column side.

The matrix simplification unit 3 packs the remaining elements undeleted on the 0th column side and stores the value of each element ($J_{ij}$) in that state in a data memory. The data memory is implemented in the solution system 1. In each example embodiment, the values stored in the data memory are assumed to be referable as an array named data.

Furthermore, for each row, the matrix simplification unit 3 stores in the index memory what column of the original matrix the remaining element undeleted corresponds to as an index. The index memory is implemented in the solution system 1. In each example embodiment, the values stored in the index memory are assumed to be referable as an array named index.

For each row, the matrix simplification unit 3 stores the number of remaining elements undeleted in the element count memory. The element count memory is implemented in the solution system 1. In each example embodiment, the values stored in the element count memory are assumed to be referable as an array named numData.

Although the solution system 1 does not implement a memory for storing the entire original matrix, the original matrix is described in the file that is obtained by the input unit 2. Therefore, by referring to that matrix, the matrix simplification unit 3 can perform the above operation.

Figure 3:
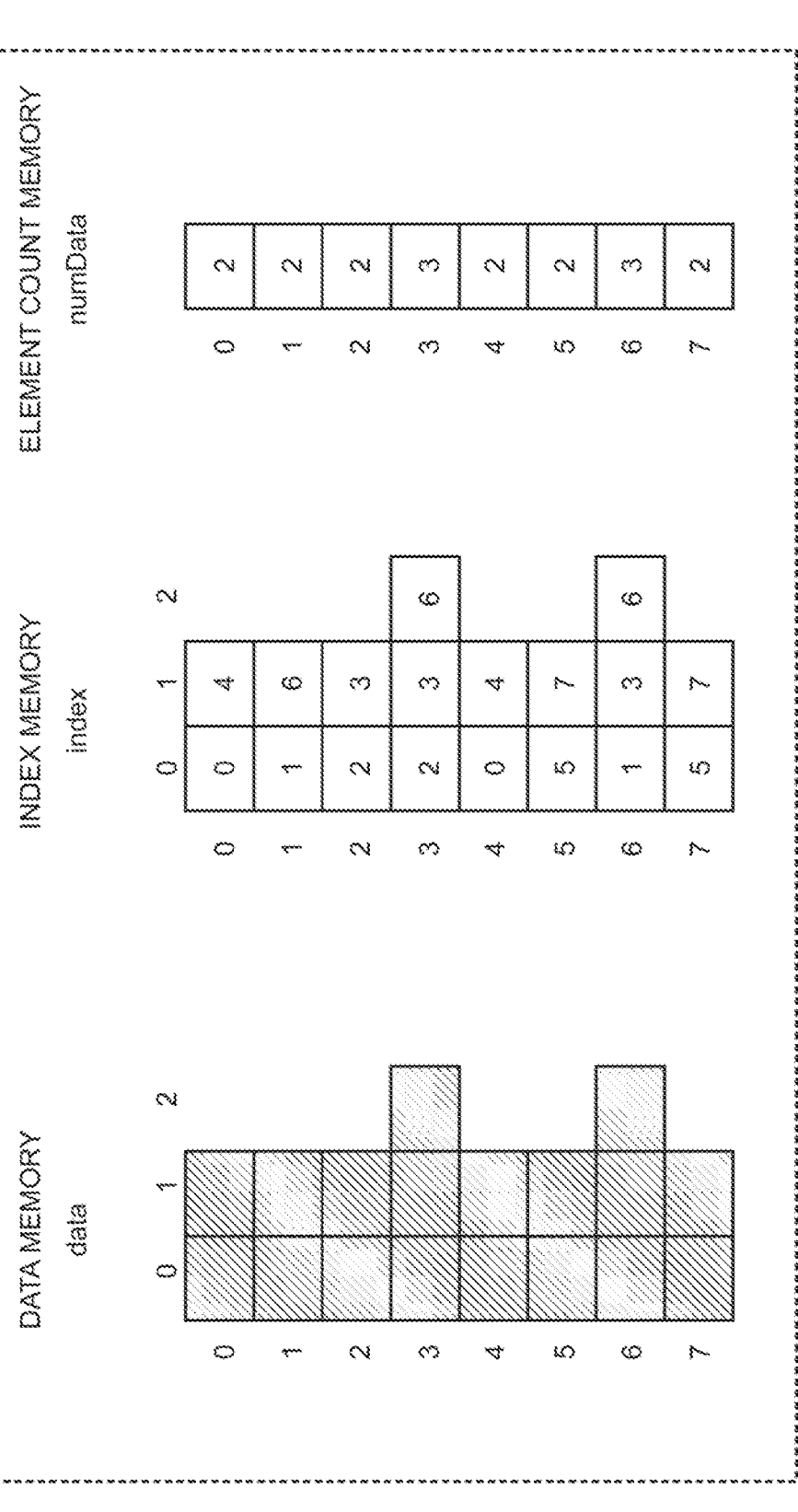
FIG. 3 It depicts a schematic diagram showing schematically the values stored in the data memory, the index memory, and the element count memory.

FIG. 3 is a schematic diagram showing schematically the values stored in the data memory, the index memory, and the element count memory. In the example shown in FIG. 3, the values stored in the data memory are not specifically shown. The data memory, the index memory, and the element count memory are provided so that the sum of their memory capacities is smaller than the capacity of the memory that can store the entire original matrix.

It can be said that each value stored in the data memory, the index memory and the element count memory represents the original matrix in the simplified form.

As mentioned above, the matrix simplification unit 3 deletes elements that have the value of "0" from the original matrix, and also deletes some elements that do not have the value of "0" from the original matrix. The following is an example of how the matrix simplification unit 3 deletes elements with non-zero values.

The matrix simplification unit 3 may delete elements with non-zero values whose absolute values are equal to or less than the threshold value. For example, assume that the vertical line pattern shown in FIG. 2 indicates that the value of the spin-to-spin connection data $J_{ij}$ is not 0, but the absolute value is equal to or less than the threshold value. In this case, the matrix simplification unit 3 deletes the elements with the value of "0", and also delete the elements with a non-zero value whose absolute value is equal to or less than the threshold value. The state that the remaining elements undeleted are stored in the data memory, and the values are stored in the index memory and element count memory accordingly is the state represented in FIG. 3.

However, when a set of spins is defined and a constraint is defined for the set, the matrix simplification unit 3 may exclude elements that represent the connection between spins belonging to the set with the defined constraint from deletion targets. For example, assume that a constraint is defined for a set consisting of spins with the identification information "0", "1", "2", and "3". In this case, the elements representing the connection between spins belonging to this set are $J_{01}, J_{10}, J_{02}, J_{20}, J_{03}, J_{30}, J_{12}, J_{21}, J_{13}, J_{31}, J_{23}$, and $J_{32}$. In this case, the matrix simplification unit 3 may exclude these elements from deletion targets. In other words, if any of these elements have an absolute value equal to or less than the threshold value, the matrix simplification unit 3 may leave the element without deleting them.

When the matrix simplification unit 3 excludes elements that represent the connection between spins belonging to the set with defined constraint from deletion targets, the effect is that the probability of deriving a state that does not satisfy the constraint as a solution is reduced.

The following is another example of how the matrix simplification unit 3 deletes elements that do not have the value of "0". The matrix simplification unit 3 may deletes elements whose value is not "0" in ascending order of absolute value from the original matrix, so that the capacity of the matrix changed into the simplified form equals the predetermined memory capacity (the sum of the capacities of the data memory, the index memory, and the element count memory). For example, assume that the sum of the capacities of the data memory, the index memory and the element count memory is R. In this case, the matrix simplification unit 3 deletes elements with the value "0". Furthermore, the matrix simplification unit 3 deletes elements whose value is not "0" in ascending order of absolute value from the original matrix until the sum of the capacities of the remaining elements undeleted and the capacities of the values stored in the index memory and the element count memory according to the remaining elements equals R. Assume that the elements to be deleted in this manner are indicated by vertical line pattern in FIG. 2. In this case, the state in which the matrix simplification unit 3 stores the remaining elements undeleted in the data memory and accordingly stores the values in the index memory and element count memory is shown in FIG. 3.

However, when a set of spins is defined and a constraint is defined for that set, the matrix simplification unit 3 may exclude elements that represent the connection between spins belonging to the set for which the constraint is defined from deletion targets. This is the same as in the previous case.

The spin state derivation unit 4 derives the state of each spin when the energy represented by the energy function (the energy function of the Ising model obtained by the input unit 2) is as small as possible, or when the energy represented by the energy function is as large as possible, based on the matrix changed into the simplified form (see example shown in FIG. 3). In other words, the spin state derivation unit 4 derives the optimal state of each spin based on the matrix changed into the simplified form. Which of the state of each spin when the energy represented by the energy function is as small as possible or when the energy represented by the energy function is as large as possible corresponds to the optimal state of each spin depends on the combinatorial optimization problem, etc. Therefore, whether to derive, as the optimal state of each spin, the state of each spin when the energy represented by the energy function is as small as possible or the state of each spin when the energy represented by the energy function is as large as possible is specified from outside (e.g., the user of the solution system 1), for the spin state derivation unit 4. This specification is not limited to any particular method. For example, whether the spin state derivation unit 4 derives the state of each spin when the energy represented by the energy function is as small as possible or when the energy represented by the energy function is as large as possible may be specified in the file obtained by the input unit 2. In the following explanation, the case in which it is specified from outside to derive the state of each spin when the energy represented by the energy function is as small as possible will be used as an example. The case in which it is specified from outside to derive the state of each spin when the energy represented by the energy function is as large as possible can also be explained in the same way as below.

In the following description, the case in which the spin state derivation unit 4 derives the optimal state of each spin by simulated annealing will be used as an example. However, the method of deriving the optimal state of each spin is not limited to simulated annealing.

The matrix simplification unit 3 and the spin state derivation unit 4 are realized, for example, by a CPU (Central Processing Unit) of a computer operating according to a solution program. For example, the CPU may read the solution program from a program storage medium such as a program storage device of the computer, and operate as the matrix simplification unit 3 and the spin state derivation unit 4 according to the solution program.

Figure 4:
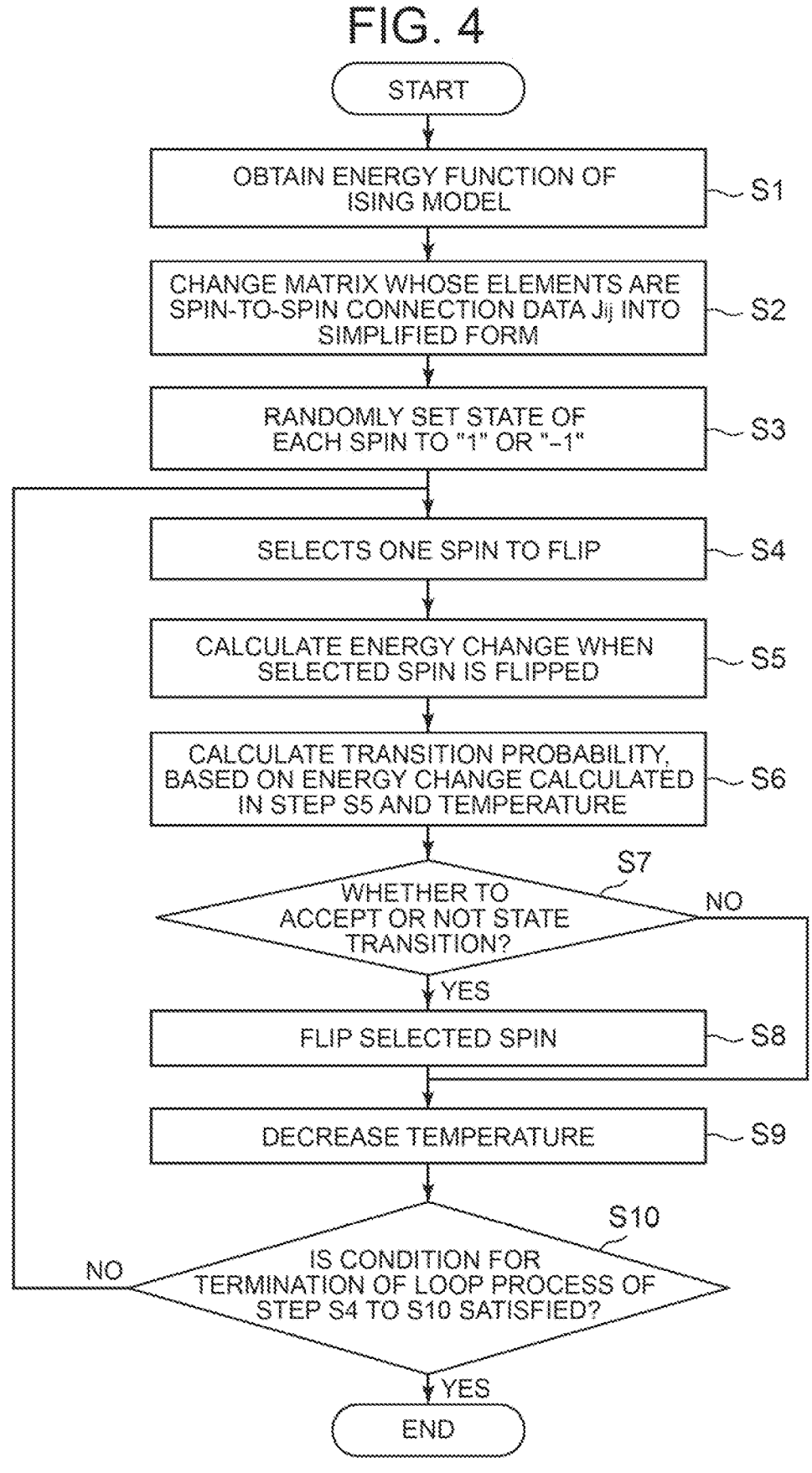
FIG. 4 It depicts a flowchart showing an example of the processing flow of the solution system in the first example embodiment of the present invention.

Next, the processing flow will be described. FIG. 4 is a flowchart showing an example of the processing flow of the solution system 1 in the first example embodiment of the present invention. Detailed explanations of matters already explained are omitted.

Assume that the temperature in simulated annealing is set to an initial value.

First, the input unit 2 obtains the energy function of the Ising model (step S1). Specifically, the input unit 2 obtains the matrix whose elements are the spin-to-spin connection data $J_{ij}$ defined for each combination of possible value of i and possible values of j, and the individual constants $h_i$ defined for each possible value of i. When a set of spins is defined and a constraint is defined for the set, the input unit 2 also obtains the constraint and the identification information of the spins belonging to the set for which the constraint is defined.

Next, the matrix simplification unit 3 changes the matrix whose elements are the spin-to-spin connection data $J_{ij}$ into the simplified form and stores the values in the data memory, the index memory and the element count memory (see FIG. 3) (step S2).

In step S2, the matrix simplification unit 3 deletes the elements with the value of "0" from the matrix obtained in step S1, and also deletes some elements that do not have the value of "0" from the matrix. Then, the matrix simplification unit 3 stores the remaining elements undeleted in the data memory (see FIG. 3), and accordingly stores the values in the index memory and the element count memory (see FIG. 3). The method of deleting elements with the non-zero value may be to delete elements whose absolute value is equal to or less than the threshold value. Alternatively, the method of deleting elements with the non-zero value may be to delete elements whose value is not "0" in ascending order of absolute value, so that the capacity of the matrix changed into the simplified form equals the predetermined memory capacity. However, when a set of spins is defined and a constraint is defined for the set, the matrix simplification unit 3 may exclude elements that represent the connection between spins belonging to the set with the defined constraint from deletion targets.

Next, the spin state derivation unit 4 randomly sets the state of each spin to "1" or "–1" (step S3).

Next, the spin state derivation unit 4 selects one spin to flip (step S4). In step S4, the spin state derivation unit 4 may, for example, randomly select one spin.

Note that "flipping" means changing state of a spin. Hereafter, the spin selected in step S4 is referred to as the selected spin.

Next to step S4, the spin state derivation unit 4 calculates the energy change when the selected spin is flipped, based on the matrix changed into the simplified form (see example shown in FIG. 3) (step S5).

The following shows how the spin state derivation unit 4 calculates the energy change when the selected spin is flipped based on the matrix changed into the simplified form (see example shown in FIG. 3). In step S5, the spin state derivation unit 4 calculates the energy change by calculating Expression (2) shown below. DeltaEnergy in Expression (2) is the energy change.

[Math. 2]

$$\text{for}(k=0;k<\text{numData[FlipSpin]};k++)$$

$$\text{DeltaEnergy}+=\text{data[FlipSpin]}[k]\times\text{SpinState[index} \\ \text{[FlipSpin]}[k]] \qquad (2)$$

In Expression (2), FlipSpin is a value corresponding to the identification information of the selected spin. In addition, data[ ][ ] is the value stored in the data memory (see FIG. 3). index[ ][ ] is the value stored in the index memory (see FIG. 3). numData[ ] is the value stored in the element count memory (see FIG. 3). SpinState[index[FlipSpin][k]] is a state of the spin (1 or –1) whose identification information is index[FlipSpin][k].

Next to step S5, the spin state derivation unit 4 calculates transition probability in simulated annealing, based on the energy change calculated in step S5 and the temperature in simulated annealing (step S6).

Next, the spin state derivation unit 4 determines whether to accept or reject the state transition based on the transition probability calculated in step S6 (step S7).

When the state transition is accepted (Yes in step S7), the spin state derivation unit 4 flips the selected spin (step S8).

Next, the spin state derivation unit 4 decreases the temperature in simulated annealing (step S9).

When the state transition is not accepted in step S7 (No in step S7), the spin state derivation unit 4 executes step S9 without executing step S8.

Next to step S9, the spin state derivation unit 4 determines whether or not the condition for termination of the loop process of step S4 to S10 is satisfied (step S10).

Examples of conditions for termination of the loop process include the temperature in simulated annealing decreasing to a predetermined temperature and the number of looping times of the loop process of steps S4 to S10 reaching a predetermined number. However, the condition for termination of the loop process is not limited to these examples, and other conditions for termination may be defined.

When the condition for termination of the loop process is not satisfied (No in step S10), the spin state derivation unit 4 repeats the operation from step S4 onward.

When the condition for termination of the loop process is satisfied (Yes in step S10), the spin state derivation unit 4 determine the state of each spin at that point as the state of each spin when the energy function is as small as possible, and terminate the process.

According to the present example embodiment, the matrix simplification unit 3 changes the matrix whose elements are the spin-to-spin connection data $J_{ij}$ into the simplified form. In this case, the matrix simplification unit 3 not only deletes the elements that have the value of "0" from the original matrix, but also deletes some elements that do not have the value of "0" from the original matrix. The spin state derivation unit 4 then derives the state of each spin when the energy represented by the energy function is as small as possible, based on the matrix changed into the simplified form. Therefore, it is not necessary to use a memory to store the entire matrix with the spin-to-spin connection data $J_{ij}$ as elements, and the optimal state of each spin can be obtained with a small amount of memory. When it is specified from the outside to derive the state of each spin when the energy represented by the energy function is as large as possible, the spin state derivation unit 4 derives the state of each spin when the energy represented by the energy function is as large as possible.

Compared with the technology described in PTL 1, the technology described in PTL 1 uses compression format of a sparse matrix when the matrix representing $J_{ij}$ is a sparse matrix. In other words, the technology described in PTL 1 represents a matrix in a form in which elements with a value of "0" are deleted. On the other hand, the present example embodiment not only deletes elements that have the value of "0" from the matrix whose elements are the spin-to-spin connection data $J_{ij}$, but also deletes some elements that do not have the value of "0" from the matrix. Therefore, according to the present example embodiment, the effect of reducing the capacity of memory for storing matrix is greater than the technology described in PTL 1.

When the Ising model is represented by a King graph, the method of matrix simplification of the present invention may be used to obtain a simplified representation of the matrix (a matrix whose elements are the spin-to-spin connection data $J_{ij}$) according to the King graph.

Second Example Embodiment

Figure 5:
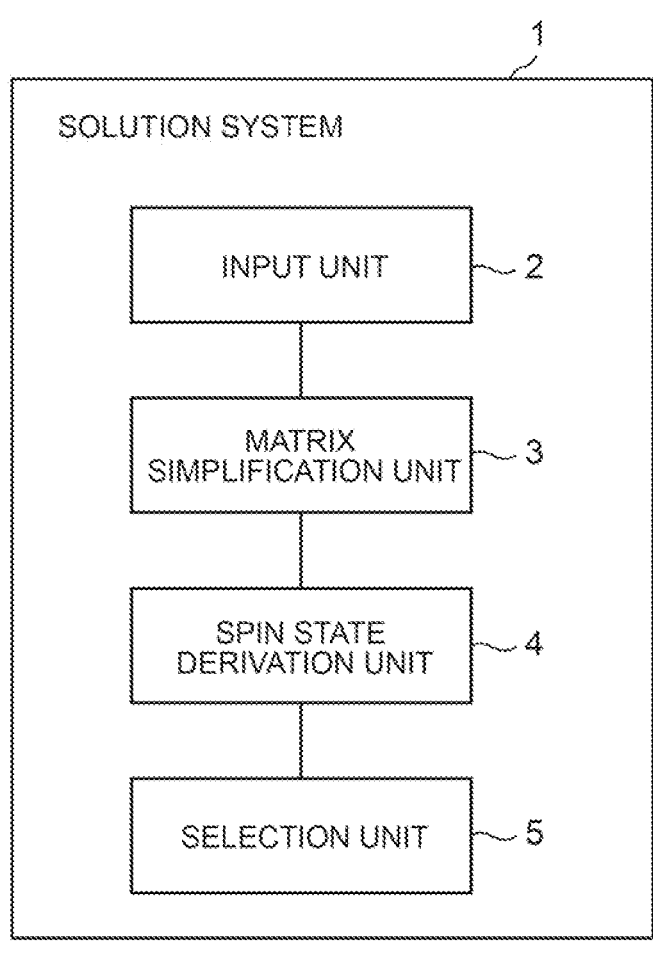
FIG. 5 It depicts a block diagram showing an example of a solution system of the second example embodiment of the present invention.

FIG. 5 is a block diagram showing an example of a solution system of the second example embodiment of the present invention. In the second embodiment, the solution system 1 includes an input unit 2, a matrix simplification unit 3, a spin state derivation unit 4, and a selection unit 5.

Elements similar to those in the first example embodiment will be denoted with the same signs as in FIG. 1, and explanations will be omitted. In the second example embodiment, the case in which it is specified from the outside to derive the state of each spin when the energy represented by the energy function is as small as possible will also be used as an example.

However, in the second example embodiment, the matrix simplification unit 3 deletes elements that have the value of "0" from the original matrix, and also deletes elements that do not have the value of "0" randomly when deleting some elements that do not have the value of "0" from the original matrix.

Then, the matrix simplification unit 3 packs the remaining elements undeleted on the 0th column side, for example, and stores the value of each element (J$_{ij}$) in that state in the data memory (see FIG. 3). For each row, the matrix simplification unit 3 stores in the index memory (see FIG. 3) what column of the original matrix the remaining element undeleted corresponds to as an index. The matrix simplification unit 3 also stores, for each row, the number of remaining elements undeleted in the element count memory (see FIG. 3). This operation is similar to the operation in the first example embodiment.

Furthermore, in the second embodiment, the matrix simplification unit 3 deletes elements that have the value of "0" from the original matrix, and also deletes elements that do not have the value of "0" randomly, and the spin state derivation unit 4 derives the state of each spin when the energy represented by the energy function is as small as possible and the energy of that state, based on the matrix changed into the simplified form. This operation is repeated multiple times. Hereafter, assume that the number of repeating times is M times, where M is an integer equal to or greater than 2. When it is specified from the outside to derive the state of each spin when the energy represented by the energy function is as large as possible, the spin state derivation unit 4 derives the state of each spin when the energy represented by the energy function is as large as possible in the above operation.

By repeating the above operation multiple times, multiple states of each spin when the energy represented by the energy function is as small as possible are obtained. The energy is also obtained for each of the states. The selection unit 5 selects the optimal state from among the obtained multiple states based on the energy derived together with the states. In the present example embodiment, the state selected by the selection unit 5 is the optimal state of each spin. When it is specified from the outside to derive the state of each spin when the energy represented by the energy function is as small as possible, the selection unit 5 selects the state of each spin corresponding to smallest energy when multiple state of each spin and energy is obtained. When it is specified from the outside to derive the state of each spin when the energy represented by the energy function is as large as possible, the selection unit 5 selects the state of each spin corresponding to largest energy when multiple state of each spin and energy is obtained.

In the second example embodiment, when the spin state derivation unit 4 derives the energy for state of each spin, the spin state derivation unit 4 uses the energy function obtained by the input unit 2 (i.e., the energy function represented by the original matrix) to derive the energy.

The matrix simplification unit 3, the spin state derivation unit 4, and the selection unit 5 are realized, for example, by a CPU of a computer operating according to a solution program. For example, the CPU may read the solution program from a program storage medium such as a program storage device of the computer, and operate as the matrix simplification unit 3, the spin state derivation unit 4, and the selection unit 5 according to the solution program.

The input unit 2 is the same as the input unit 2 of the first example embodiment.

Figure 7:
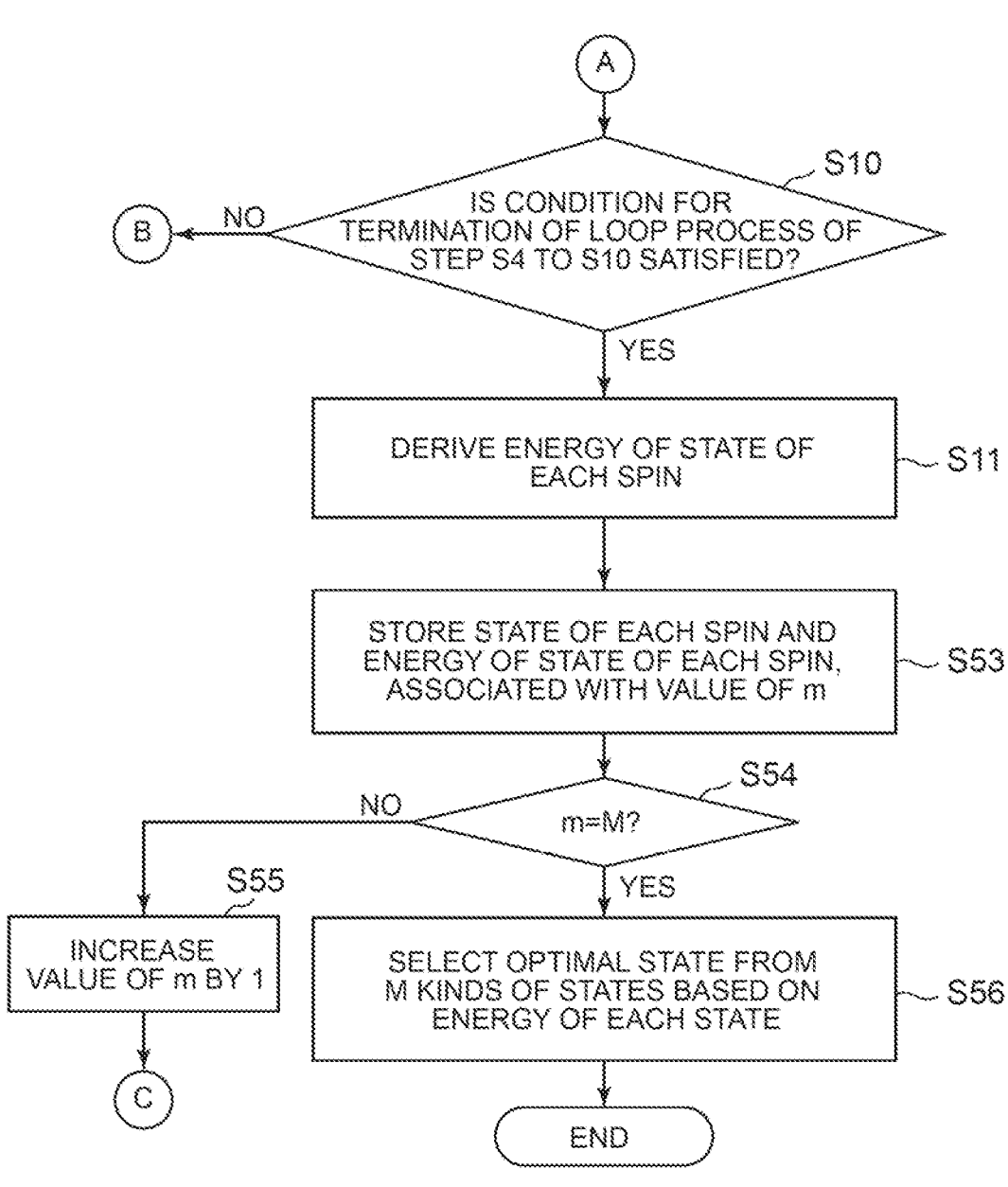
FIG. 7 It depicts a flowchart showing an example of the processing flow of the solution system in the second example embodiment of the present invention.
Figure 11:
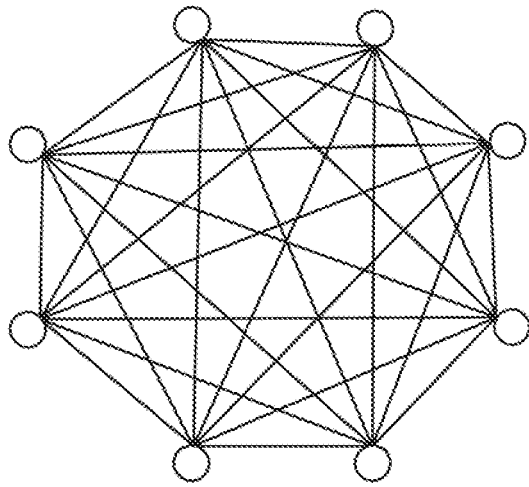
FIG. 11 It depicts a diagram showing an example of a complete graph for the case of eight spins.

Next, the processing flow will be described. FIG. 6 and FIG. 7 represent a flowchart showing an example of the processing flow of the solution system in the second example embodiment of the present invention. Operations similar to those in the first example embodiment are denoted with the same signs as those shown in FIG. 4, and explanations are omitted.

First, the input unit 2 obtains the energy function of the Ising model (step S1). Step S1 is similar to step S1 in the first example embodiment (see FIG. 4).

Next, the spin state derivation unit 4 sets the value of variable m to 1 (step S51). m is a variable that represents the number of executing times of the loop process starting from step S52.

Next, the spin state derivation unit 4 sets the temperature in simulated annealing to an initial value (step S52).

Next, the matrix simplification unit 3 changes the matrix whose elements are the spin-to-spin connection data J$_{ij}$ into the simplified form and stores the values in the data memory, the index memory and the element count memory (see FIG. 3) (step S2). In the second example embodiment, the matrix simplification unit 3 deletes the elements with the value of "0" from the matrix obtained in step S1. In addition, when deleting some elements that do not have the value of "0" from the matrix, the matrix simplification unit 3 deletes elements that do not have the value of "0" randomly. In this case, the matrix simplification unit 3 may also randomly determine the number of elements that do not have the value of "0" to be deleted.

In the second example embodiment, the loop process starting from step S52 is executed multiple times (M times). Therefore, step S2 is also executed multiple times. In each time of step S2, elements with a non-zero value are randomly deleted, so the elements to be deleted that do not have the value of "0" may be different each time.

However, when a set of spins is defined and a constraint is defined for that set, the matrix simplification unit 3 may exclude elements that represent the connection between spins belonging to the set for which the constraint is defined from deletion targets. This is the same as in the first example embodiment.

After step S2, the spin state derivation unit 4 performs steps S3 to S7. These steps S3 to S7 are similar to steps S3 to S7 in the first example embodiment.

Then, when the state transition is accepted in step S7 (Yes in step S7), the spin state derivation unit 4 flips the selected spin (step S8).

Next, the spin state derivation unit 4 decreases the temperature in simulated annealing (step S9). Steps S8 and S9 are the same as steps S8 and S 9 in the first example embodiment.

When the state transition is not accepted in step S7 (No in step S7), the spin state derivation unit 4 executes step S9 without executing step S8.

Next to step S9, the spin state derivation unit 4 determines whether or not the condition for termination of the loop process of step S4 to S10 is satisfied (step S10, see FIG. 7). Step S10 is the same as step S10 in the first example embodiment.

When the condition for termination of the loop process of steps S4 to S10 is not satisfied (No in step S10), the spin state derivation unit 4 repeats the operation from step S4 onward.

When the condition for termination of the loop process of steps S4 to S10 is satisfied (Yes in step S10), the spin state derivation unit 4 derives the energy of the state of each spin at that point (step S11). In this case, the spin state derivation unit 4 derives the energy using the energy function obtained by the input unit 2 (i.e., the energy function represented by the original matrix). The state of each spin at this point can be said to be the state in which the energy represented by the energy function is as small as possible.

Next, the spin state derivation unit 4 stores the state of each spin at that time and the energy of the state of each spin (i.e., the energy derived in step S11), associated with the value of the variable m (step S53).

Next, the spin state derivation unit 4 determines whether m=M (step S54). The fact that m<M means that the loop process starting from step S52 (see FIG. 6) has not been executed a predetermined number of times (M times). The fact that m=M means that the loop process starting from step S52 (see FIG. 6) has been executed a predetermined number of times (M times). In the examples shown in FIG. 6 and FIG. 7, m>M is never the case.

When m≠M (No in step S54), the spin state derivation unit 4 increases the value of the variable m by 1 (step S55). After step S55, the solution system 1 repeats the operation from step S52 onward.

When m=M (Yes in step S54), M kinds of states of each spin and M kinds of energies of states of each spin have been obtained. In other words, M kinds of "states of each spin" are obtained, and M kinds of energies corresponding to M kinds of states are obtained. These M kinds of energies are all derived by using the energy function obtained by the input unit 2 (i.e., the energy function represented by the original matrix). The selection unit 5 selects the optimal state from the M kinds of states based on the energy of each state (step S56). Specifically, the selection unit 5 selects "state of each spin" for the minimum energy among the M kinds of energies, and defines the selected "state of each spin" as the optimal "state of each spin". Assume that it is specified from the outside to derive the state of each spin when the energy represented by the energy function is as large as possible. In this case, the selection unit 5 selects "state of each spin" for the largest energy among M kinds of energies, and defines the selected "state of each spin" as the optimal "state of each spin".

In the present example embodiment, as in the first example embodiment, the matrix simplification unit 3 not only deletes the elements that have the value of "0" from the original matrix, but also deletes some elements that do not have the value of "0" from the original matrix. Therefore, it is not necessary to use a memory to store the entire matrix with the spin-to-spin connection data $J_{ij}$ as elements, and the optimal state of each spin can be obtained with a small amount of memory. In other words, the same effect as in the first example embodiment can be obtained in the present embodiment.

Next, variations of the first example embodiment and the second example embodiment described above are explained. In the first example embodiment and the second example embodiment above, the case in which the energy function of the Ising model is given was described. In other words, the case in which the input unit 2 obtains the energy function of the Ising model was described. The energy function given to the solution system 1 (the energy function obtained by the input unit 2) may be an energy function of QUBO (Quadratic Unconstrained Binary Optimization) energy function.

QUBO is a model in which the states of individual spins are represented by "1" or "0". "1" in QUBO can be referred to as the first value, similar to "1" in the Ising model. Also, "0" in QUBO can be referred to as the second value, similar to "−1" in the Ising model.

The expression representing the energy in a combinatorial optimization problem can also be converted to the energy function in QUBO. This conversion method is known. The energy function in the Ising model and the energy function in QUBO can be converted to each other.

The energy function in QUBO is expressed as in Expression (3) below.

[Math. 3]

$$H_{QUBO} = \Sigma_{ij} Q_{ij} x_i x_j \qquad (3)$$

Both i and j in Expression (3) are variables representing a spin. In addition, $x_i$ in Expression (3) is a variable representing the state of spin i, and $x_j$ is a variable representing the state of spin j. $Q_{ij}$ in Expression (3) is a constant corresponding to a combination of spin i and spin j. For each combination of possible value of i and possible value of j, $Q_{ij}$ is determined as a constant.

When the number of spins is N, then the number of $Q_{ij}$ is $N^2$. In this case, the $N^2$ constants $Q_{ij}$ can be represented as elements of an N-by-N matrix. In this variation, the matrix with $Q_{ij}$ as elements is treated in the same way as the matrix with $J_{ij}$ as elements in the first example embodiment and the second example embodiment.

The input unit 2 obtains in file format a matrix whose elements are $Q_{ij}$ defined for each combination of possible value of i and possible value of j. Obtaining this matrix means obtaining the energy function of QUBO expressed as in Expression (3).

Then, the matrix simplification unit 3 deletes the elements that have a value of "0" from the matrix, and also deletes some elements that do not have the value of "0" from the matrix. The manner in which elements that do not have the value of "0" are deleted may be the same as that described in the first example embodiment and the second example embodiment.

Other points are the same as in the first example embodiment and the second example embodiment. The same effects as in the first example embodiment and the second example embodiment can be obtained in this variation.

FIG. 8 is a schematic block diagram showing an example of computer configuration of the solution system 1 of each example embodiment of the present invention. The computer 1000 includes a CPU 1001, a main memory 1002, an auxiliary memory 1003, an interface 1004, and a data reading device 1005.

The solution system 1 of each example embodiment of the present invention is realized by a computer 1000. The operation of the solution system 1 is stored in the auxiliary memory 1003 in the form of a solution program. The CPU 1001 reads the solution program from the auxiliary memory 1003, expands it in the main memory 1002, and executes the processes described in above each example embodiment.

The auxiliary memory 1003 is an example of a non-transitory tangible medium. Other examples of non-transitory tangible media include magnetic disks connected via interface 1004, magneto-optical disks, CD-ROM (Compact Disk Read Only Memory), DVD-ROM (Digital Versatile Disk Read Only Memory), semiconductor memory, etc. When the program is delivered to the computer 1000 through a communication line, the computer 1000 may expand the program in the main memory 1002 and execute the process described in the above each example embodiment according to the program.

Some or all of each of the components may be realized by general purpose or dedicated circuitry, processor, or a combination of these. These may comprise a single chip or multiple chips connected via a bus. Some or all of each of the components may be realized by a combination of the above-mentioned circuitry, etc. and a program.

When some or all of each of components is realized by multiple information processing devices, circuits, etc., the multiple information processing devices, circuits, etc. may be centrally located or distributed. For example, the information processing devices and circuits may be realized as a client-and-server system, a cloud computing system, etc., each of which is connected via a communication network.

The following is an overview of the invention. FIG. 9 is a block diagram showing an overview of the solution system of the present invention. The solution system of the present invention includes matrix simplification means 93 and spin state derivation means 94.

The matrix simplification means 93 (e.g., the matrix simplification unit 3) changes a matrix used in an energy function in a model representing states of individual spins by a first value or a second value into simplified form. In this case, the matrix simplification means 93 deletes elements that have a value of "0" from the matrix, and also deletes some elements that do not have the value of "0" from the matrix, thereby to change the matrix into the simplified form.

The spin state derivation means 94 (e.g., spin state derivation unit 4) derives state of each spin when energy represented by the energy function is as small as possible or a state of each spin when energy represented by the energy function is as large as possible, based on the matrix changed into the simplified form. Whether the spin state derivation means derives the state of each spin when energy represented by the energy function is as small as possible or the state of each spin when energy represented by the energy function is as large as possible is specified from outside.

According to such a configuration, the optimal state of individual spins can be obtained with a small amount of memory.

When a set of spins is defined and a constraint is defined for the set, the matrix simplification means 93 may exclude elements representing connection between spins belonging to the set for which the constraint is defined from deletion targets.

The matrix simplification means 93 may delete elements whose absolute value is equal to or less than a threshold value among the elements that do not have the value of "0", from the matrix.

The matrix simplification means 93 may delete the elements that do not have the value of "0" in ascending order of absolute value from the matrix, so that capacity of the matrix changed into the simplified form equals predetermined memory capacity.

An operation in which the matrix simplification means 93 deletes elements that have a value of "0" from the matrix, and also deletes elements that do not have the value of "0" randomly, and the spin state derivation means 94 derives the state of each spin when energy represented by the energy function is as small as possible or the state of each spin when energy represented by the energy function is as large as possible, based on the matrix changed into the simplified form, and derives energy of derived state may be repeated multiple times. The solution system may include selection means (e.g., the selection unit 5) for selecting an optimal state from among multiple states obtained as states of each spin, based on the energy derived with the state of each spin.

Although the present invention has been described above with reference to example embodiments, the present invention is not limited to the above example embodiments. Various changes may be made to the structure and details of the present invention, that may be understood by those skilled in the art within the scope of the present invention.

INDUSTRIAL APPLICABILITY

The invention is suitably applicable to a solution system that obtains a state of each spin corresponding to a solution of a combinatorial optimization problem.

REFERENCE SIGNS LIST

1 Solution system
2 Input unit
3 Matrix simplification unit
4 Spin state derivation unit
5 Selection Unit

What is claimed is:

1. A solution system comprising:
a memory configured to store instructions; and
a processor configured to execute the instructions to:
    change a matrix used in an energy function in a model representing states of individual spins by a first value or a second value into simplified form;
    derive a state of each spin in a case where energy represented by the energy function is as small as possible or a state of each spin in a case where energy represented by the energy function is as large as possible, based on the matrix changed into the simplified form;
    delete elements that have a value of "0" from the matrix, and also delete some elements that do not have the value of "0" from the matrix, to thereby change the matrix into the simplified form; and
    control storage, in the memory, of the matrix which has been changed into the simplified form,
    wherein whether the processor derives the state of each spin in a case where energy represented by the energy function is as small as possible or the state of each spin in a case where energy represented by the energy function is as large as possible, is specified from outside.

2. The solution system according to claim 1, wherein the processor is configured to execute the instructions to:
    in a case where a set of spins is defined and a constraint is defined for the set, exclude elements representing connection between spins belonging to the set for which the constraint is defined from deletion targets.

3. The solution system according to claim 1, wherein the processor is configured to execute the instructions to:
    delete elements whose absolute value is equal to or less than a threshold value among the elements that do not have the value of "0", from the matrix.

4. The solution system according to claim 1, wherein the processor is configured to execute the instructions to:
    delete the elements that do not have the value of "0" in ascending order of absolute value from the matrix, so that capacity of the matrix changed into the simplified form equals a predetermined memory capacity.

5. The solution system according to claim 1, wherein the processor is configured to execute the instructions to:

execute an operation in which the processor deletes elements that have a value of "0" from the matrix, and also deletes elements that do not have the value of "0" randomly, and the processor derives the state of each spin in a case where energy represented by the energy function is as small as possible or the state of each spin in a case where energy represented by the energy function is as large as possible, based on the matrix changed into the simplified form, and derives energy of derived state is repeated multiple times; and select an optimal state from among multiple states obtained as states of each spin, based on the energy derived with the state of each spin.

6. A solution method comprising:

executing a matrix simplification process comprising changing a matrix used in an energy function in a model representing states of individual spins by a first value or a second value into simplified form;

executing a spin state derivation process comprising deriving state of each spin in a case where energy represented by the energy function is as small as possible or a state of each spin in a case where energy represented by the energy function is as large as possible, based on the matrix changed into the simplified form, deleting elements that have a value of "0" from the matrix, and also deleting some elements that do not have the value of "0" from the matrix, to thereby change the matrix into the simplified form; and controlling storage, in memory, of the matrix which has been changed into the simplified form, wherein whether to derive, in the spin state derivation process, the state of each spin in a case where energy represented by the energy function is as small as possible or the state of each spin in a case where energy represented by the energy function is as large as possible, is specified from outside.

7. The solution method according to claim 6, wherein the matrix simplification process comprises:

in a case where a set of spins is defined and a constraint is defined for the set, excluding elements representing connection between spins belonging to the set for which the constraint is defined from deletion targets.

8. A non-transitory computer-readable recording medium in on which a solution program is recorded, wherein the solution program causes a computer to execute:

a matrix simplification process comprising changing a matrix used in an energy function in a model representing states of individual spins by a first value or a second value into simplified form;

a spin state derivation process comprising deriving state of each spin in a case where energy represented by the energy function is as small as possible or a state of each spin in a case where energy represented by the energy function is as large as possible, based on the matrix changed into the simplified form; and control storage, in a memory, of the matrix which has been changed into the simplified form, wherein the matrix simplification process comprises deleting elements that have a value of "0" from the matrix, and also deleting some elements that do not have the value of "0" from the matrix, thereby to change the matrix into the simplified form, and wherein whether to cause the computer to derive, in the spin state derivation process, the state of each spin in a case where energy represented by the energy function is as small as possible or the state of each spin in a case where energy represented by the energy function is as large as possible is specified from outside.

9. The non-transitory computer-readable recording medium on which the solution program is recorded according to claim 8, wherein the matrix simplification process comprises, in a case where a set of spins is defined and a constraint is defined for the set, excluding elements representing connection between spins belonging to the set for which the constraint is defined from deletion targets.

* * * * *